Patented Jan. 22, 1935

UNITED STATES PATENT OFFICE 1,989,065

PROCESS FOR PREPARING DIAZO-TYPES AND LIGHT-SENSITIVE LAYERS THEREFOR

Maximilian Paul Schmidt, Oskar Süs, and Robert Franke, Wiesbaden - Biebrich, Germany, assignors to Kalle & Co., Aktiengesellschaft, Wiesbaden-Biebrich, Germany, a corporation of Germany No Drawing. Application July 3, 1933, Serial No. 678,990. In Germany July 2, 1932

6 Claims. (Cl. 95—7)

(Granted under the provisions of sec. 14, act of March 2, 1927; 357 O. G. 5)

The present invention relates to diazo-types and light-sensitive layers for preparing them.

In diazo-type printing polyhydroxy compounds have been used with success as azo components, because they are readily soluble, scarcely become yellow, have a high coupling power and permit the effecting of dark neutral shades. For instance with resorcinol or phloroglucin, when using the usual stable diazo-compounds for printing China-ink drawings or other originals of good covering power, neutral dark brown to black tints can be obtained. If the originals are, however, thin pencil or charcoal drawings and the same light-sensitive layers are used the prints obtained are not neutral but have colored, mostly more or less reddish to violet lines, which are, moreover, scarcely suitable for being further copied since their covering power is not sufficient. These colored lines are, for instance, particularly observed in the so-called wet development of diazo-types, i. e. in the immersion into the developer liquid or when too much developer has been applied; they are very undesirable especially in the case of artistic prints.

According to this invention there are used for the preparation of diazo-types with a good result, either in the light-sensitive layer or in the developer solution, azo components of the following formula:

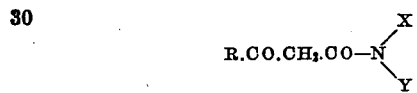

wherein R stands for an aryl, alkyl or aralkyl group, X and Y stand for a hydrogen atom or an aryl, alkyl, aralkyl or acyl group or a hydrogenated cyclic radical, if desired, together with other azo dyestuff components.

By means of these azo components which have hitherto not yet been utilized in diazo-type printing, there are obtained with the usual diazo components pictures of neutral shades which have a good depth of color and a high covering power. These azo components have furthermore the advantage that they may well be used in mixture with other azo components and are then very suitable for shading off and for producing neutral tints of good covering power. They may particularly be used in mixture with the hitherto used polyhydroxy compounds, such as phloroglucin, resorcinol or the like, because they render the shades produced with them more neutral and give them a better covering power and because they have almost the same coupling velocity as the said polyhydroxy compounds; in fact they always couple simultaneously and thus yield compound shades. When polyhydroxy compounds were used together with other azo components it was found that the polyhydroxy compounds couple more quickly than the other components and consequently, particularly in the case of fine strokes and lines, the desired neutral tone could not be attained. This disadvantage is obviated by the use of the azo components of the formula given above. The result obtained with the said azo components, that the shades are rendered deeper and are given a greater covering power is, moreover, advantageous if further copies are intended to be made of the prints.

The following examples illustrate the invention:

(1) 30 grams of tartaric acid or citric acid or another organic acid, 20 grams of boric acid, 20 grams of aluminium sulfate, 30 grams of the sodium salt of naphthalenetrisulfonic acid, 50 grams of thiourea, 19 grams of the zinc chloride salt of the diazo compound from 1-diethylamino-3-oxethyl-4-aminobenzene, 4 grams of cyclohexylacetoacetic acid-amide of the formula

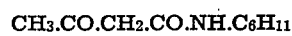

and 2.5 grams of phloroglucin are dissolved in 1 liter of water and the solution is applied in the usual manner on a support, such as paper. The paper is exposed to light under a pencil original and developed in gaseous ammonia or an alkaline liquid. Black shades are obtained which have a more neutral appearance than shades obtained without the addition of cyclohexylacetoacetic acid-amide.

Instead of 4 grams of cyclohexylacetoacetic acid-amide there may be used 4 grams of acetoacetic acid-benzylamide or 3 grams of acetoacetic acid-benzylamide and 0.5 gram of resorcinol or 3 grams of acetoacetic acid-anilide or 3 grams of acetoacetic acid-ortho-methylanilide or 2 grams of acetoacetic acid-alpha-aminopyridine.

(2) 15 grams of tartaric acid or another hydroxy acid, 15 grams of boric acid, 20 grams of aluminium sulfate, 25 grams of thiourea, 25 grams of sodium 1.3.6-naphthalenetrisulfonate, 10 grams of diazodiphenylaminesulfate, 25 grams of disodium salt of 2-naphthol-3.6-disulfonic acid and 1 gram of 7-hydroxynaphthalene-1-acetoacetic acid-amide are dissolved in 1 liter of water. The solution is applied on a suitable base as indicated in the preceding example. The exposure to light under a pattern is followed by a development with ammonia whereby bluish-black prints are obtained.

(3) 50 grams of tartaric acid or citric acid, 40 grams of boric acid, 40 grams of aluminium sulfate, 50 grams of thiourea, 40 grams of the sodium salt of 1.3.6-naphthalenetrisulfonic acid, 50 grams of the tin salt of the diazo compound of 1-ethylbenzylamino-4-aminobenzene, 2.4 grams of phloroglucin and 3 grams of acetoacetic acid-alpha-aminopyridine are dissolved in 1 liter of water. The solution is applied on a suitable base as indicated in Example 1. After exposure to light and development with ammonia black pictures are obtained.

Instead of 3 grams of acetoacetic acid-alpha-aminopyridine there may also be used 6 grams of acetoacetic acid-benzylamide.

(4) 15 grams of tartaric acid, 10 grams of boric acid, 30 grams of sodium 1.3.6-naphthalene-trisulfonate, 20 grams of aluminium sulfate and 30 grams of the zinc chloride salt of the diazo compound of 1-benzoylamino-2.5-dimethoxy-4-aminobenzene are dissolved in 1 liter of water. The solution is applied on paper. The paper is exposed to light. Development is effected by applying a solution of 200 grams of sodium acetate or sodium citrate, 20 grams of sodium bicarbonate, 100 grams of sodium chloride, 2.5 grams of phloroglucin, 0.9 gram of acetoacetic acid-anilide by means of a roller, a sponge, a brush or the like or by passing the print through the said solution. When the prints are made from a lead pencil drawing neutral greyish-black lines are obtained.

Instead of 0.9 gram of acetoacetic acid-anilide there may also be used 1 gram of acetoacetic acid-benzylanilide or 0.5 gram of acetoacetic acid-alpha-aminopyridine or 2 grams of benzoyl-acetic acid-benzylamide.

The preparation described in Example 4 may also be applied on transparent paper or tracing cloth and after exposure to light be developed with a solution of 15 grams of borax, 35 grams of sodium bicarbonate, 80 grams of sodium chloride, 130 grams of sodium acetate, 3 grams of phloroglucin and 3 grams of acetoacetic acid-anilide in 1 liter of water. Prints are obtained which appear by reflected light black and by transmitted light dark yellowish-green. On account of their good covering power they are highly suitable as originals for further prints.

(5) 15 grams of diazodiphenylaminesulfate, 30 grams of sodium 1.3.6-naphthalenetrisulfonate, 20 grams of phosphoric acid or lactic acid, 20 grams of boric acid, 30 grams of ammonium sulfate and 40 grams of glucose are dissolved in 1 liter of water. The solution is applied on paper and after the paper has been exposed to light, the print is developed by means of a solution of 40 grams of sodium carbonate, 50 grams of thiosulfate, 4.5 grams of phloroglucin, 1 gram of beta-naphthol and 2 grams of acetoacetic acid-anilide in 1 liter of water. Beautiful neutral dark shades are obtained. If the developer does not contain the anilide, strongly reddish shades are liable to be produced, particularly if a too large quantity of developer is applied.

We claim:

1. In the process of preparing diazo-types from light-sensitive layers containing light-sensitive diazo-compounds the step which consists in coupling the diazo compound after exposure to light with an azo dyestuff component of the following general formula:

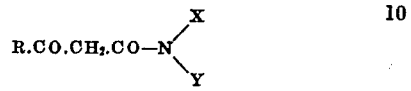

wherein R stands for an aryl, alkyl or aralkyl group, X and Y stand for a hydrogen atom or aryl, alkyl, aralkyl, acyl or hydrogenated cyclic radicals.

2. In the process of preparing diazo-types from light-sensitive layers containing light-sensitive diazo-compounds the step which consists in coupling the diazo compound after exposure to light with an azo dyestuff component of the following general formula:

$$CH_3.CO.CH_2.CO—NH—R$$

wherein R stands for an aromatic or hydro-aromatic radical.

3. In the process of preparing diazo-types from light-sensitive layers containing light-sensitive diazo-compounds the step which consists in coupling the diazo compound after exposure to light with an azo dyestuff component of the following general formula:

$$CH_3.CO.CH_2.CO—NH—R$$

wherein R stands for a phenyl, benzyl or cyclohexyl radical.

4. Light-sensitive layers containing a light-sensitive diazo compound and as azo component a compound of the following general formula:

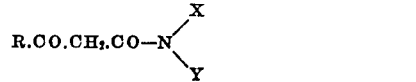

wherein R stands for an aryl, alkyl or aralkyl group, X and Y stand for a hydrogen atom or aryl, alkyl, aralkyl, acyl or hydrogenated cyclic radicals.

5. Light-sensitive layers containing a light-sensitive diazo compound and as azo component a compound of the following general formula:

$$CH_3.CO.CH_2.CO—NH—R$$

wherein R stands for an aromatic or hydro-aromatic radical.

6. Light-sensitive layers containing a light-sensitive diazo compound and as azo component a compound of the following general formula:

$$CH_3.CO.CH_2.CO—NH—R$$

wherein R stands for a phenyl, benzyl or cyclohexyl radical.

MAXIMILIAN PAUL SCHMIDT.
OSKAR SÜS.
ROBERT FRANKE.